(No Model.) 4 Sheets—Sheet 1.
R. S. MATTESON.
MACHINE FOR MAKING ORNAMENTAL CHAINS.

No. 274,955. Patented Apr. 3, 1883.

WITNESSES:
Geo. W. Cady
Henry J. Stapleton

INVENTOR:
Rufus S. Matteson
by Edson Salisbury Jones,
Attorney.

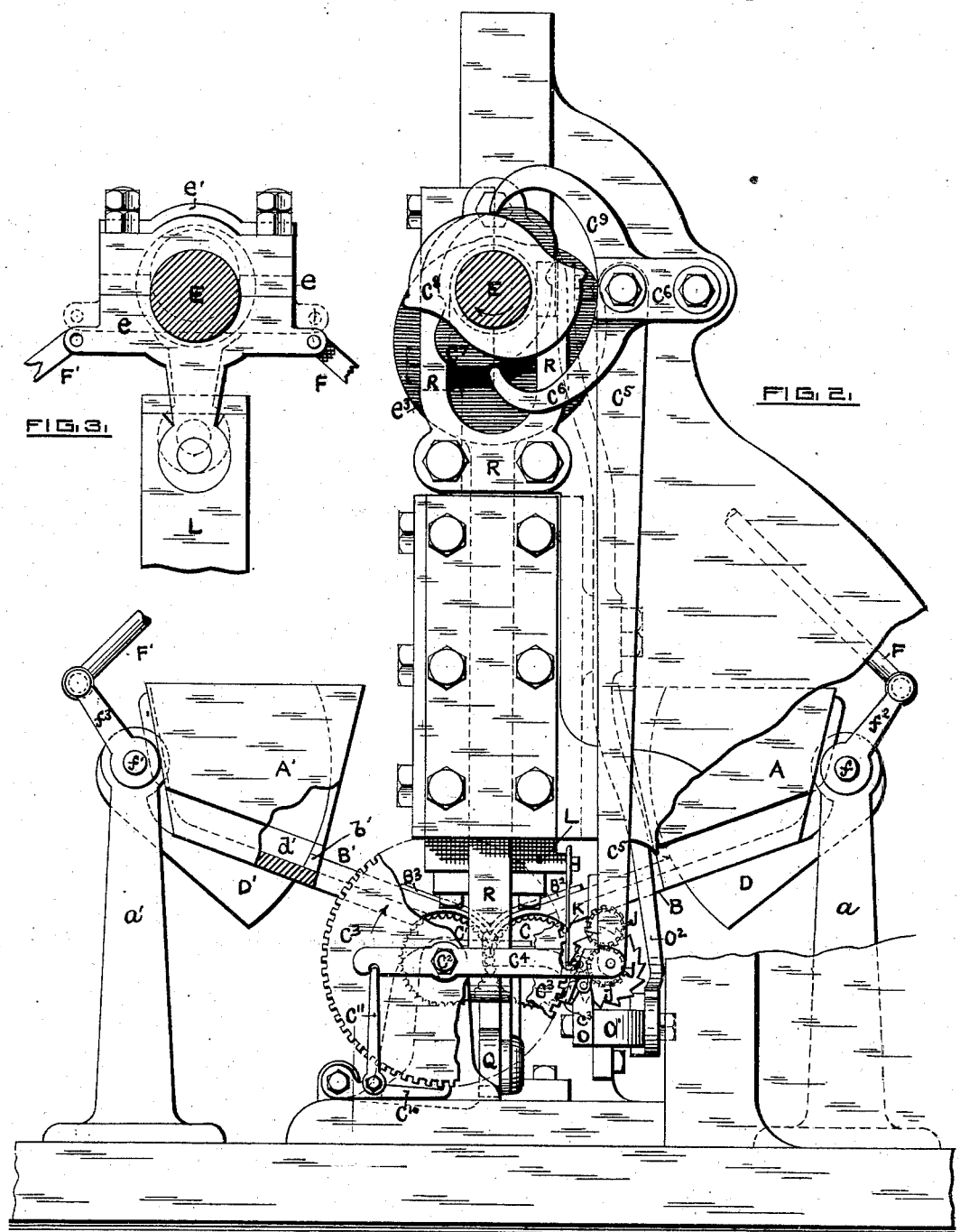

(No Model.) 4 Sheets—Sheet 3.

R. S. MATTESON.
MACHINE FOR MAKING ORNAMENTAL CHAINS.

No. 274,955. Patented Apr. 3, 1883.

WITNESSES: Geo M Cary Henry J. Stapelton.

INVENTOR: Rufus S. Matteson by Edwin Salisbury Jones, Attorney.

(No Model.)  4 Sheets—Sheet 4.

R. S. MATTESON.
MACHINE FOR MAKING ORNAMENTAL CHAINS.

No. 274,955. Patented Apr. 3, 1883.

WITNESSES.
Geo. W. Cacy
Henry J. Stapelton

INVENTOR
Rufus S. Matteson
by Edson Salisbury Jones
Attorney

N. PETERS. Photo-Lithographer, Washington, D. C.

UNITED STATES PATENT OFFICE.

RUFUS S. MATTESON, OF PROVIDENCE, RHODE ISLAND.

MACHINE FOR MAKING ORNAMENTAL CHAINS.

SPECIFICATION forming part of Letters Patent No. 274,955, dated April 3, 1883.

Application filed December 7, 1882. (No model.)

*To all whom it may concern:*

Be it known that I, RUFUS S. MATTESON, of the city and county of Providence, and State of Rhode Island, have invented certain new and useful Improvements in Machines for Making Chains; and I do hereby declare that the following specification, taken in connection with the accompanying drawings, forming a part of the same, is a full, clear, and exact description thereof.

My invention consists in a machine for making that variety of ornamental chains composed of rings or rollers which are arranged in rows and secured to each other by pins or staples passing transversely through the same.

As a whole, the machine comprehends an organization of parts or elements which act automatically; and it consists of mechanism for feeding the rings in rows to a roulette receiver or receivers, mechanism for rotating the said receiver or receivers step-by-step, mechanism for feeding the material from which the fastening pins or staples are made, mechanism for forming said pins or staples from said material, mechanism for passing the fastening-pins or staples into the rings, and mechanism for clinching or securing the ends of the pins or staples to complete the chain. As far as I am aware, such a machine, as a whole, is new, as are also combinations of certain of its elements, which will be hereinafter described, and pointed out in the claims.

Figure 1:
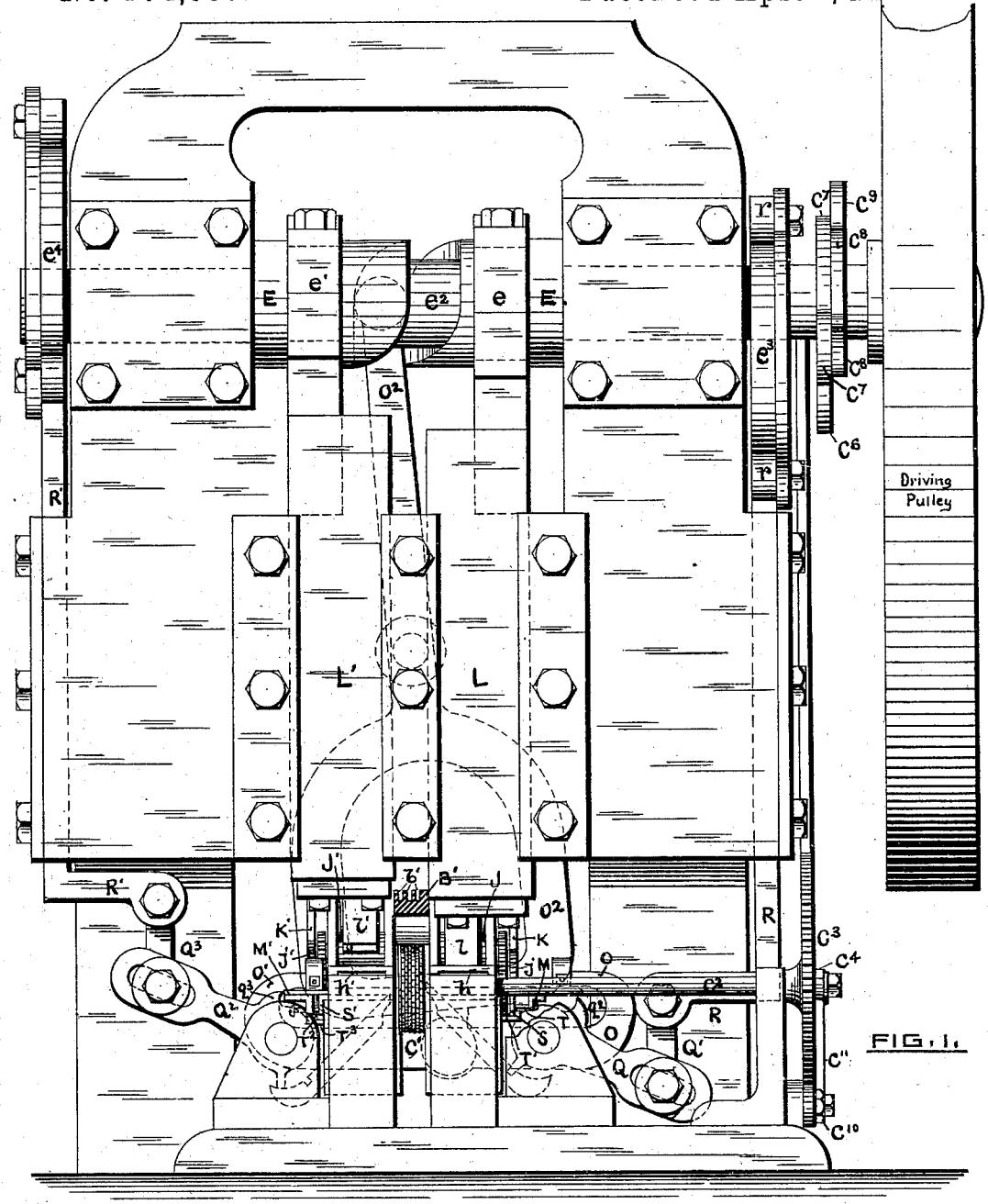
Figure 4:
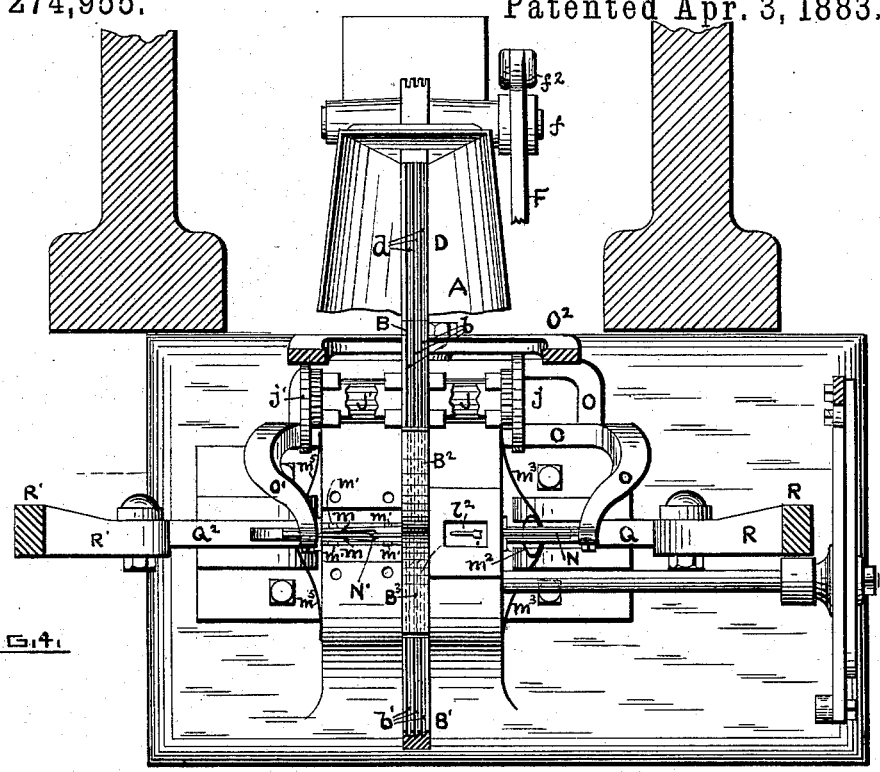
Figure 5:
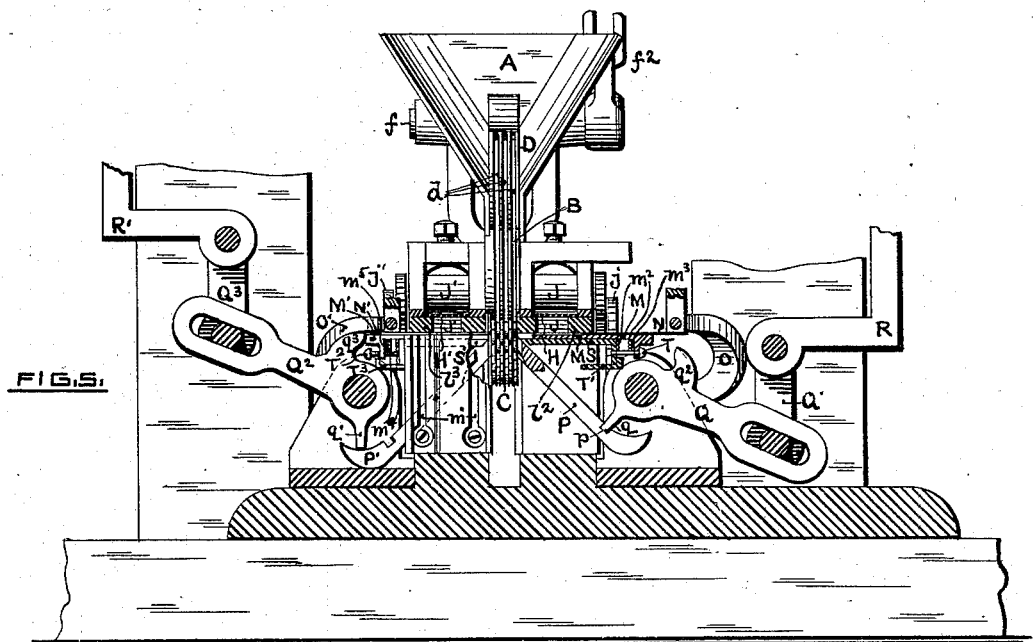
Figure 6:
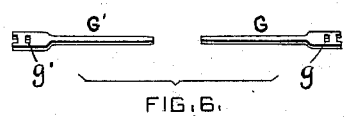
Figures 7, 8:
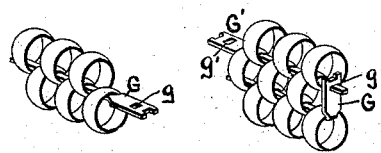
Figure 9:
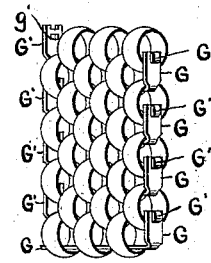
Figure 10:
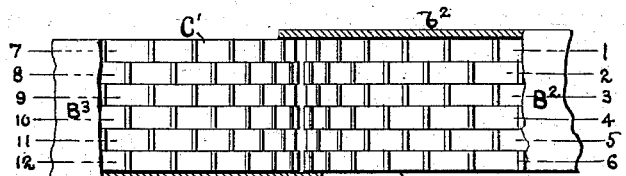
Figure 11:
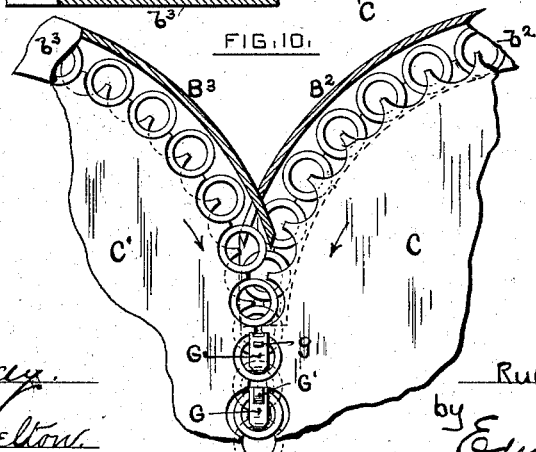

Referring to the drawings, Figure 1 represents in front elevation a machine embodying my improvements. Fig. 2 shows a side elevation of the same. Figs. 3, 10, and 11 represent certain details of construction, the last two figures being enlarged. Fig. 4 represents a plan of the machine with the top portion removed. Fig. 5 shows a central vertical section of a portion of the machine. Fig. 6 represents in perspective certain forms of fastening-pins on an enlarged scale. Figs. 7 and 8 show steps in the formation of the chain. Fig. 9 represents in perspective and on an enlarged scale a portion of a completed chain.

The chain which the machine shown in the drawings is organized to make consists of six longitudinal rows of rings alternated in such a manner as to produce transverse rows of three rings each. The rings are secured to each other by two series of transverse fastening-pins, which are inserted into the rows from opposite sides of the chain, and have enlarged heads, which are perforated and bent at right angles to their shanks. The points of the pins of one series pass through the perforations in the heads of the pins of the other series, and are clinched upon the same.

As particularly shown in Fig. 2, the machine is provided with two hoppers, A A', for holding in mass the rings from which the chain is made. These hoppers are located respectively at the front and rear of the machine, and are supported upon standards $a$ $a'$. Extending from the hoppers are downwardly-inclined conveyers B B', which are respectively provided with channels $b$ $b'$, for conveying the rings in rows from the hoppers to two roulette-receivers, C C'. In order to prevent the rings from clogging in the hoppers, and to insure the delivery of the rings to the channels in the conveyers, arms D D' are employed to stir the masses of rings, which arms are mounted on rock-shafts $f f'$, journaled in the standards $a$ $a'$, vibrate in vertical planes in openings in the hopper-bottoms, and are furnished with channels $d$ $d'$, which are in alignment respectively with the channels $b$ $b'$ in the conveyers B B'. Motion is imparted to the arms D D' by the shaft E, Figs. 1, 2, and 3, provided with an eccentric, to the strap $e$ of which rods F F' are pivoted, the said rods connecting respectively with cranks $f^2 f^3$, attached to the rock-shafts $f f'$.

The periphery of each of the roulettes C C' is provided with six circumferential series of cups, alternated so as to form transverse rows of three, as particularly shown in Fig. 10. The series of cups numbered 1, 3, and 5 in the roulette C are in alignment with the channels in the conveyer B, from which channels the said series of cups receive rings as the roulette is rotated, and the series of cups numbered 8, 10, and 12 in the roulette C' are in alignment with the channels in the conveyer B' and receive rings therefrom. The series of cups numbered 2, 4, and 6 in the roulette C and the series 7, 9, and 11 in the roulette C' do not receive rings from the conveyers. The former series act to steady the rings in the roulette C' and the latter series the rings in the roulette C when the roulettes have revolved sufficiently to bring the rows of rings which they are carrying into proper transverse alignment to receive the fastening-pins as shown in Fig. 11. Between the times when the rings are received by the roulettes and the times when they are brought into proper transverse alignment to receive the fastening-pins the rings are prevented from passing out of the roulettes by curved guard-plates $B^2$ $B^3$, attached to the conveyers B B', respectively, and overlying the roulettes, as shown in Figs. 2 and 11. The rings in the series of cups 1 and 12 are supported transversely on the outside by flanges $b^2$ $b^3$, respectively, attached to the guard-plates, and on the inside by the points of the series of cups 2 and 11. The remaining rows of rings are supported transversely by the points of the cups on either side of them.

As shown in Fig. 1, the roulette C' is mounted on a shaft, $C^2$, to which a ratchet, $C^3$, is secured. As shown in Fig. 2, this ratchet is engaged by a pawl, $c^3$, mounted on a pivoted arm, $C^4$, which arm is connected by a rod, $C^5$, to a lever, $C^6$. The engagement of a cam, $C^7$, on the shaft E with the lever $C^6$ causes the pawl $c^3$ to rotate the roulette C' step by step and bring its rings into proper position to receive the fastening-pins. The action of a cam, $C^8$, on an arm, $C^9$, which is attached to the lever $C^6$, returns the pawl to its normal position. During the time the fastening-pins are being inserted and clinched, hereinafter to be described, the roulettes are firmly held by the engagement of a detent-lever, $C^{10}$, Fig. 2, with the teeth of the ratchet $C^3$. An arm, $C^{11}$, is attached to the detent-lever, and is engaged by the end of the lever $C^4$, so that as the pawl rises preparatory to descending to move the ratchet the detent-lever is moved out of engagement with the ratchet to allow the latter to revolve when the proper time comes.

The shaft upon which the roulette C is mounted may be geared to the shaft $C^2$, upon which the roulette C' is mounted; but as the machine is arranged revolution is imparted to the roulette C by the engagement of the rings in the roulette C' with the unoccupied cups in the roulette C, so that both roulettes move together step by step.

The pins G G', which fasten the rings together, are shown in perspective in Fig. 6. These pins are punched from two strips, H H', of sheet metal, Fig. 5, which are drawn into the machine through guide-slots $h$ $h'$, Fig. 1, by two sets of rolls, J J J' J', which are located at the rear of the machine, as shown in Figs. 1, 2, 4, and 5, although said feed-rolls may be placed at the front of the machine and be arranged to push the said strips into and through the machine in a well-known manner. The upper and lower rolls of each set are respectively geared together, and to the lower rolls are attached ratchets $j$ $j'$, Figs. 1, 2, 4, and 5. The rolls are revolved step by step by the engagement with the ratchets $j$ $j'$ of spring pull-pawls K K', Figs. 1 and 2, which are respectively attached to two plungers, L L', moving vertically in the frame of the machine. These plungers are pivoted at the top to two straps, $e$ $e'$, Figs. 1 and 3, which surround eccentrics on the shaft E, the said eccentrics being so timed with relation to each other as to cause the plungers to alternate in their upward and downward movements. To the lower ends of the plungers are secured punches $l$ $l'$, Fig. 1, which co-operate with cutting-dies $l^2$ $l^3$, Fig. 5, respectively. Across the tops of these dies the strips, H H', of sheet metal pass, as shown in Fig. 5, so that as the plungers L L' descend alternately pins G G', substantially in the form shown in Fig. 6, are punched from the strips, the points of the pins being toward each other.

Immediately below the die $l^2$ a table, M, Fig. 5, is located, the upper surface of which is at a distance equal to or slightly greater than the thickness of a fastening-pin from the lower surface of the die. By successive actions of the punch $l$, the fastening-pins G, lying horizontally and one above the other, are passed down through the die $l^2$ in a stack until the lowermost one rests upon the table M, ready to be passed into those two transverse rows of rings which have been brought into alignment with said pin by the revolution of the roulette-carriers C C', hereinbefore explained. In order to steady the pins as they are passed into the rings and properly to direct their points, guides are employed—one pair for the pins G and another pair for the pins G'. The pair $m$ $m$ for guiding the pins G' are shown at Fig. 4. These guides overlie a table, M', (similar to the table M,) and are pressed toward each other by light springs $m'$, Figs. 4 and 5. Between these guides the pins G', one after another, are deposited, and between a similar pair of guides the pins G are deposited. A pin, G, is passed into the rings, as shown in Fig. 7, by a plunger, N, Figs. 4 and 5, which slides between the guides just mentioned and between the die $l^2$ and the table M. The rear end of this plunger is attached to one arm, $o$, of a yoke, O, which yoke, by means of a connecting-piece, O', Fig. 4, is pivoted to a lever, $O^2$, Figs. 1 and 4. This lever is pivoted to the frame of the machine, and is vibrated by a cam, $e^2$, Fig. 1, on the shaft E, to cause the plunger N to perform its office.

A pin, G, having been passed into the rings by the plunger N, the next step in the formation of the chain is to bend up the head of the pin, as shown in Fig. 8. This is accomplished by the rising of a bar, P, Fig. 5, which slides diagonally in the frame of the machine, and has its rear end furnished with a notch, $p$, which is engaged by a tooth, $q$, on a pivoted lever, Q. The rear end of this lever is connected by a link, Q', to the bent end of a vertical rod, R, Figs. 1, 2, 4, and 5, which slides in the frame of the machine, and has its upper end provided with rollers $r$, Fig. 1, which are engaged by a cam, $e^3$, on the shaft E. This cam reciprocates the rod R vertically and slides the bar P diagonally to and from the roulettes C C'. The head of the pin G having been bent upward, the roulettes are rotated a step by the mechanism already described to bring the next transverse row of rings held in the roulettes into such a position as to receive a pin, G', which is to be passed into said rings from the opposite side of the machine, and also for the purpose of bringing the slot $g$ in the head of the pin G, Figs. 6, 7, and 8, into alignment with the pin G', so that the point of the latter can pass through said slot, in readiness to be clinched over the head of the pin G, as shown in Fig. 9. The roulettes may, however, be revolved for this purpose before or during the bending of the head of the pin G, if preferred.

The pins G' are punched from the strip, H', of sheet metal by the punch $l'$ and die $l^3$, and are passed down through said die in a stack by successive actions of the punch until the lowermost pin rests upon the table M', Fig. 5. A pin, G', is passed into the rings between the guides $m$ $m$, Fig. 4, by a plunger, N', the rear end of which is secured to an arm, $o'$, of the yoke O, Figs. 4 and 5. The yoke O is moved in the proper direction to cause the plunger N' to insert a pin, G', by the action of the cam $e^2$ on the lever O², hereinbefore mentioned, which cam reciprocates the yoke O to bring the plungers N N' successively into action. During the insertion of the pin G' the head of the pin G is supported by the bar P, the upper end of which is grooved, as shown in Fig. 5, in order that the point of the pin G' may pass sufficiently beyond the face of the pin-head G to be clinched upon it, as shown in Fig. 9. The plunger N' having passed a pin, G', into the rings, and the point of said pin through the perforation $g$ in the head of the pin G, so that the point of the former pin projects beyond the face of the head of the latter pin, as shown in Fig. 8, the next step is to bend up the head of the pin G'. This is accomplished by the rising of the bar P', Fig. 5. This bar is moved diagonally upward by a tooth, $q'$, on a vibrating lever, Q², which is connected by a link, Q³, to a rod, R', reciprocated vertically in the frame of the machine by a cam, $e^4$, on the shaft E, Fig. 1, the motions being similar to those already described with relation to moving the bar P. The head of the pin G' having been bent upward, the roulettes revolve another step to bring the next transverse row of rings into proper alignment to receive a pin G, hereafter to be inserted, and so as to bring the perforation $g'$ in the head of the pin G' into alignment with the second pin G, the point of which is to pass through said perforation to be clinched over the head of the pin G'.

The next step is the clinching of the point of the pin G' upon the head of the first pin G. While the bar P' supports the head of the pin G' the point of said pin is bent upward by a forward movement of the table M, Fig. 5, the inner end of which is concaved for the purpose of accomplishing the bending. Preferably there is employed, in connection with the table M, a sliding bed, S, the inner end of which is in advance of the inner end of the table when both are in normal position, as shown in Fig. 5. The office of this bed is to pass under the end of a pin G' and prevent the same from accidentally being bent downward while it is being clinched. The relative normal positions of the bed S and table M are maintained by an elliptical spring, $m^2$, Figs. 4 and 5, which bears upon the rear end of the bed and upon a lug depending from the rear end of the table, and by a stop-pin, T, which is secured to the bed and passes through the said lug on the table M, as shown in Fig. 5. The bed and the table are maintained in a rearward position by a spring, $m^3$, Figs. 4 and 5, which bears upon the frame of the machine and upon the lug at the rear of the table M, the said rearward position being determined by the contact of the rear bent end of the bed S with the bent end of a stop, T', as shown in Fig. 5. By the engagement of a tooth, $q^2$, on the vibrating lever Q with the rear end of the table M the table and the bed S are moved forward simultaneously (the bar P being at the same time withdrawn by the tooth $q$) until the inner end of the bed S passes under the point of the pin G' and comes in contact with the upturned head of the first pin G. The table M continues to move forward, however, (the spring $m^2$ being compressed,) and its concave end bends up the end of the pin G' and clinches it over the head of the first pin G, as shown in Fig. 9. This operation having been performed, the lever Q swings downward and the bed S and table M retreat to their rearward positions. Although I prefer to employ the bed S, yet it and the spring $m^2$ may be dispensed with and the stop-pin T be extended and secured to the frame of the machine. During the time the point of the pin G' is being clinched a second pin G is being inserted by the mechanism and in the manner hereinbefore described, the point of said second pin G passing through the perforation $g'$ in the upturned head of the pin G', in readiness to be clinched thereon. The head of the second pin G is next bent upward by the mechanism and in the manner already described. The roulettes now revolve another step to bring the next transverse row of rings into alignment with a second pin G', now to be inserted, and to bring the perforation $g$ in the upturned head of the second pin G into a position to receive the point of the second pin G'.

The next step is the clinching of the point of the second pin G upon the head of the first pin G' while the head of the pin G is supported by the bar P. The clinching of the point of a pin G upon the head of a pin G' is accomplished by the table M', which has a concave end similar to the table M. In connection with the table M' there are employed a bed, S', springs $m^4$ and $m^5$, a stop-pin, T², and a stop, T³, (shown in Fig. 5,) all corresponding respectively in formation and action with the bed S, springs $m^2$ and $m^3$, stop-pin T, and stop T', hereinbefore described. The table M' is moved forward to perform the clinching of the point of a pin G by a tooth, $q^3$, on the lever $Q^2$, and the table is retreated, after having performed the work, by the spring $m^5$, the bed S' moving with said table and performing an office similar to that described for the bed S. During the time the point of a pin G is being clinched another pin G' is being inserted, and while the table M' is being advanced to perform its office the bar P' is retreated by the tooth $q'$, in readiness to be advanced to bend up and support the head of the next pin G'.

The several operations hereinbefore described are now repeated, and the chain is manufactured in a continuous length, which passes down through the machine into any convenient receptacle.

Although I prefer to employ hoppers for holding the rings in mass and delivering them to the channeled conveyers, yet the hoppers may be dispensed with and the rings be fed by hand or in any preferred manner.

It will be readily understood that chains having a lesser or greater number of longitudinal rows of rings than that shown and described may be made upon the machine by changing the capacity of the conveyers and roulettes, correspondingly changing the lengths of the fastening-pins, and properly regulating the movements of the mechanisms which insert the pins into the rings.

If desired, the mechanism for forming the fastening-pins may be removed from and be independent of the machine, and the pins already formed may be fed in any preferred manner down upon the tables M M'.

Fastening-pins of other shapes than that shown may be employed to secure the rings to each other—as, for instance, a U-shaped pin or staple of round, oval, or flat wire. Such pins would be best made from a coil of wire fed into the machine by suitable rolls, from which wire pieces would be successively removed by suitable cutters, the said pieces being bent into U shape by suitable formers or devices, and then fed edgewise down upon one or both tables, M M', or equivalent devices. Such pins could be inserted into the rings from one or both sides of the machine, and both ends of the pins would be clinched on the rings by one or both of the tables, or other equivalent and suitable means.

The roulettes may be solid; but preferably they are composed of a series of disks having cupped peripheries, which are placed side by side and clamped together on the roulette-shafts by nuts in a well-known manner. This construction enables the cups to be arranged in alternate transverse rows, as hereinbefore described, and also allows the cups to be arranged in transverse rows without alternation. The object of this latter arrangement is to enable a chain to be made on the machine which is composed of longitudinal rows of rings which do not alternate transversely, such a chain being well known. The staple form of fastening-pin is best adapted to secure to each other the rows of rings in such a chain.

Although I have shown and described two roulettes for receiving and carrying the rings into the proper position to receive the fastening-pins, yet I am aware that all the rings to form a chain may be delivered by a single conveyer, having the proper number of channels, to a single roulette—$C^6$, for instance—and the remaining roulette, either with a cupped periphery, as described, or a plain periphery, be used only as a guard to steady the rings immediately before and at the time the fastening-pins are being inserted and clinched. I am also aware that the second roulette may be entirely dispensed with, and the rings be held and steadied in the cups of the single roulette by extending the guard-plate $B^3$ down to a point a little below the plane in which the fastening-pins are inserted. All these constructions are within the spirit and scope of my invention.

What I claim, and desire to secure by Letters Patent, is—

1. In a machine for making chains, the combination of a channeled conveyer for delivering the rings in rows, a roulette-receiver having its periphery provided with series of cups, as described, suitable mechanism, as described, for giving motion to the roulette, and a guard for holding the rings in the roulette, substantially as set forth.

2. The combination of two channeled conveyers for delivering the rings in alternate rows, two roulettes having their peripheries provided with series of cups, as described, for receiving the rings from said conveyers, suitable mechanism, as described, for giving motion to the roulettes, and guards for holding the rings in the roulettes, substantially as set forth.

3. The combination of a hopper for holding the rings in mass, a stirrer-arm for agitating the rings, a channeled conveyer for delivering the rings in rows from the hopper, a roulette having its periphery provided with series of cups to receive the rings, as described, suitable mechanism, as described, for giving motion to the roulette, and a guard for holding the rings in the roulette, substantially as set forth.

4. The combination of means, substantially as described, for holding and steadying the rings while the fastening-pins are being inserted, and suitable mechanism, as described, for inserting the fastening-pins into the rings, substantially as set forth.

5. The combination of means, substantially as described, for holding and steadying the rings while the fastening-pins are being inserted, suitable mechanism, as described, for inserting the fastening-pins into the rings, and